United States Patent [19]

Sun et al.

[11] Patent Number: 5,406,518

[45] Date of Patent: Apr. 11, 1995

[54] VARIABLE LENGTH DELAY CIRCUIT UTILIZING AN INTEGRATED MEMORY DEVICE WITH MULTIPLE-INPUT AND MULTIPLE-OUTPUT CONFIGURATION

[75] Inventors: Cheng-Yun Sun, Taichung; Yung-Jung Jan, Taipei Hsien; Ching-Hsiang Yang, Chia-Li, all of Taiwan, Prov. of China

[73] Assignee: Industrial Technology Research Institute, Hsinchu, Taiwan, Prov. of China

[21] Appl. No.: 193,247

[22] Filed: Feb. 8, 1994

[51] Int. Cl.$^6$ .............................................. G11C 7/00
[52] U.S. Cl. ........................................ 365/194; 365/78; 365/189.02; 365/189.12; 365/240
[58] Field of Search ................. 365/194, 239, 240, 76, 365/78, 189.12, 189.02

[56] References Cited

U.S. PATENT DOCUMENTS

| | | | |
|---|---|---|---|
| 4,648,077 | 3/1987 | Pinkham | 365/240 |
| 4,866,675 | 9/1989 | Kawashima | 365/194 |
| 4,876,670 | 10/1989 | Nakabayashi | 365/194 |
| 4,953,128 | 8/1990 | Kawai | 365/194 |

Primary Examiner—Eugene R. LaRoche
Assistant Examiner—Son Mai
Attorney, Agent, or Firm—Bo-In Lin

[57] ABSTRACT

The present invention discloses an apparatus for receiving an ordered sequence of input data and for delaying the output of a delay output item by a variable-length delay-time. The apparatus includes an input port for receiving the ordered sequence of input data and the variable-length delay-time. The apparatus further includes an integrated data storage, a random access memory (RAM) for storing the ordered sequence of input data according to a storage-order corresponding to the ordered sequence of the input data. The apparatus further includes a delay output port for accessing and outputting the delay output item in the storage means according to the variable-length delay-time and the storage-order such that the delay output item is delayed by the variable-length delay-time.

7 Claims, 7 Drawing Sheets

VARIABLE LENGTH DELAY CIRCUIT UTILIZING AN INTEGRATED MEMORY DEVICE WITH MULTIPLE-INPUT AND MULTIPLE-OUTPUT CONFIGURATION

BACKGROUND OF THE INVENTION

1. Field of the Invention

This invention relates generally to an apparatus and method for delaying the output of an input data for a specified variable length of time. More particularly, this invention relates to an apparatus and method for delaying the output of an input data for a plurality of variable lengths of time with a delay circuit structure which allows simultaneous multiple input and multiple output operations thus increasing the throughput of a digital signal processor and meanwhile reduces the hardware requirements of the delay circuit.

2. Description of the Prior Art

As larger volume of data, often in the form of binary bits, are being electronically transmitted, stored and later retrieved, the precision and flexibility of controlling the delays for outputting an input item by a variable length of time often become very important design factors for various types of applications. The variable duration of delay time for outputting an input data item is usually measured in the unit of clock cycles of a data processor. For high bandwidth applications, not only that the clock rate of a data processor is required to be increased, but it is also required that the data processor is able to receive multiple input and generate multiple output simultaneously with different delay times which are precisely and flexibly adjustable. In addition to these increasing demands for system design to achieve high level of performance, another major criterion for integrated circuit (IC) implementation of the variable delay circuit is to maintain a simple and systematic circuit design. It is essential that the circuit for variable length delay may be conveniently implemented by the use of IC technology with circuit design which has less level of complexity such that the cost of design and manufacture of these delay circuits may be maintained at reasonable low levels.

Conventionally, for the purposes of synchronization or ghost cancellation, delays of blocks of video data are provided by the use of programmable shift registers. The delay circuit has a series of shift registers and the delay of the output is achieved by sequentially reading a data item into this series of shift registers and then sequentially reading it out. By repeating the input and output operations through this series of registers, a variable length of delay can be achieved. However, for the purpose of achieving extended variable delay, large number of shift registers with complex supporting control circuits would have to be employed and the delay circuit would become very big and expensive.

In order to overcome this limitation encountered by the shift-register type of delay circuits, several prior art variable length delay circuits are disclosed which employ a random access memory (RAM) to delay the output. Japanese Laying-open Gazette No. 38939/1978 entitled 'Variable Length Shift Register Device' discloses a variable bit length shift register comprising a RAM to achieve the variable length delay. In another Japanese Laying-open Gazette No. 42529/1978 entitled 'Variable Shift Register' discloses a variable bit length shift register comprising a RAM with a variable counter, and another Japanese Laying-open Gazette No. 42634/1978 entitled 'Variable Shift Register' discloses a variable bit length shift register comprising a RAM and a ring counter for the purpose of delaying the output of an input data by a variable length. Since writing and reading operations can not be performed simultaneously on the RAM for the circuits disclosed in these three references, the techniques disclosed in these Japanese Applications are not suitable for modern applications. The limitation is caused by the difficulty that the length of one delay cycle must be at least twice the length of the access time to the RAM. Thus, the operation speed is limited. Additionally, as the writing cycles and the reading cycles must be controlled by different circuits, the control circuits becomes very complicate and may not be suitable for IC implementation.

Besides the above mentioned Japanese references, there are other RAM-based variable delay circuits well known in the art wherein reading and writing can be simultaneously performed. As all these RAM based variable delay devices employ multiple writing and reading operations to achieve the intended delays, depending on the number of input and output ports used, the following speed of input/output (I/O) operations are generally required in a delay circuit for time-sharing operations when the frequency of a system clock is X-Hz. A RAM-based delay circuit, when equipped with dual ports, may simultaneously read and write at a frequency of X-Hz to achieve the time-sharing application of this delay circuit to allow a minimum delay of (1/X) seconds. For a single-port system, in order to achieve a time-sharing operation, the I/O system must read and write at a frequency of 2X-Hz (double speed) for the purpose of delaying output with the same minimum duration of delay. In order to achieve a minimum length of delay of shorter duration, the I/O speed has to be proportionally increased. For example, for a minimum delay of (1/aX) seconds where a is an integer, the frequency of an I/O operation must be controlled at least 2(aX)-Hz for a system of single port and must be aX-Hz for a system with dual I/O ports. The system configuration for this type of implementation is to divide the RAM into separate and independent of a segments. Due to the need to write to and then read from the RAM, multiple input/output control circuits to manage the operations or writing and reading are required which greatly complicate the control circuits.

Nakabayashi et al. discloses in U.S. Pat. No. 4,876,670 entitled "Variable Delay Circuit for Delaying Input Data" (Issued on Oct. 24, 1989) a variable delay circuit for delaying the input data. The delay circuit has a two dimensional array of memory cells for storing the input data. A read address decoder and a write address decoder are used for generating a memory cell address to read and write the input data from and to selected memory cells. A programmable timing signal is generated by a time signal generator. The timing signal is generated to be synchronized with the operation of the writing of the input data in order to control the reading of the input data by the read address decoder after a programmable time delay. The programmable time delay can be set by the timing signal generator so that the time delay may be flexibly adjusted. The technique disclosed in this Patent may be more flexible for application to various time delaying devices, such circuits are however still limited by the highly sophisticate and complicate control circuits which must be implemented for the timing signal generator for generating programmable delay signals. The cost for design and manufacture of such circuits would prevent the delay circuits from being economically and broadly utilized. Additionally, the delay circuits as disclosed by Nakabayashi et al. is limited by the fact that it can generate a single delay output at a specific point in time. For high frequency applications, a demand for high bandwidth performance is also imposed on the variable delay circuits due to the single output limitation which further increases the cost in the implementation of the variable delay circuit.

Kawai et al. disclose in a U.S. Pat. No. 4,943,128, entitled 'Variable Delay Circuit for Delaying Input Data' (Issued on Aug. 28, 1990) a variable delay circuit to delay the output of an input data. An address counter which counts the clock pluses sequentially to provide a count value as an address signal to a coincidence detecting circuit and a decoder. The coincidence detecting circuit receives a delay data generated by a delay data generating circuit. The coincidence detecting circuit then compares the delay data with the address signal and applies a reset signal to the address counter when the they coincident with each other. The address counter repeats the above operation sequentially in response to the reset signal after the count of address is reset to a predetermined value. The decoder specifies a memory for performing a reading and writing operation in response to the address signal. A control circuit is also used to control a data output circuit and a data input circuit to write and read the data from specific memory cells for storing the input data.

Even that the delay circuit as disclosed by Kawai et al. provides a greater degree of flexibility and control accuracy wherein the delayed output is generated by the coincidence detection circuit in cooperation with the address decoder, the delay circuit as disclosed by Kawai et al. suffers the same disadvantage as that encountered in the invention disclosed by Nakabayashi et al. The control circuits become even more complicate and difficult to design and manufacture. The delay circuits could cause the systems which use the disclosed devices to be more expensive to use. Furthermore, the delay circuit as disclosed by Kawai et al. suffers the same difficulty as that of Nabayashi as it also generates only one single delay output from one RAM at a time.

Since modern communication and multi-media systems often include various types of digital signal processing systems for performing video or audio signal processes. These systems commonly require very long yet dynamically changing delays. There exists an even greater demand to provide a delay circuit and design techniques which can handle these variable length delay requirements. It is desirable that these delay circuits are less complicate and meanwhile able to provide greater flexibility to generate multiple delayed output to satisfy the requirements of these modern digital signal processing systems.

The applicants of the present invention have submitted another co-pending patent application, assigned to the same assignee, to address these requirements. The disclosure made in that patent application (Patent Application number is yet to be assigned) is incorporated herein by reference. The invention as disclosed in that patent application is an attempt to overcome the limitation of the prior art by providing a less complicate delay circuit. One of the preferred embodiments, e.g., a delay circuit 5 is shown in FIGS. 1A and 1B wherein FIG. 1A is identical to FIG. 4 of the referenced Patent Application (Patent Application number is yet to be assigned).

The delay circuit 5 employs only a single RAM 10 for supporting three tap banks. The single RAM 10 is controlled by a clock means 12 and provided with an access means 14, i.e., an I/O buffer, to perform the input and output functions. For the purpose of illustration, the RAM is assumed to be employed in a ghost cancellation system with a storage capacity of 512 storage locations. One of the key features realized by the referenced Patent Application (Patent Application number is yet to be assigned) is the fact that for a ghost cancellation system, the aggregate value of various delays commonly required is less then 512 which is the total lines of a video display on a television screen. Therefore, a complimentary relationship exists between various delay values and a plurality of these delays will not exceed 512 increments of delays in the aggregate. For that reason, the RAM 10 can be divided into three variable delay segments, i.e., segments 10-1, 10-2, and 10-3, as shown in Fig. 1B corresponding to the circuit functional block diagram as shown in FIG. 1A.

Referring to the description provided in the referenced Patent Application (Patent Application number is yet to be assigned) for FIG. 4, the RAM 10 is divided into three variable delay segments wherein each segment has a size of 150, 200, and 162 storage locations respectively. Three sets of circuitries implemented as 'delay means', i.e., delay means 16, 44, and 50 are used to control the writing of an input data and the reading of an output corresponding to a delayed input in segment 10-1, 10-2, and 10-3 respectively. Therefore, the delay circuit 5 as disclosed in this prior art patent application provides an improved variable delay circuit 5 which can accept requests for multiple delay values using only a single RAM with a single data input in each clock cycle via the I/O buffer 14. A single RAM can thus be used to provide the delayed output with different delays.

The variable delay circuit 5 as shown in FIGS. 1A and 1B is still limited by several difficulties. First of all, in order to generate three different delayed output items, the RAM has to be divided into three segments, i.e., segments 10-1, 10-2, and 10-3, and controlled by three delay means, i.e., the delay means 16, 44, and 50. These delay means 16, 44, and 50 cause the delay circuit 5 to occupy more IC chip surface areas and increases the complexity of the circuit design due to the interconnecting lines among these three set of delay means. This specific difficulty in requiring separate sets of delay control circuits to generate different delay output may often limit the number of delay requests to be less than three. Additional requests for different delay values would certainly add more circuits and cause the variable delay circuit to be too voluminous for fabrication as an IC circuit. Secondly, the length of each delay is limited by the fact that the aggregate of these three different delays must be less than the total locations of the RAM, e.g., 512. In case a first delay value requested is a long duration of delay, the second and the third delays may not be able to be processed simultaneously due to this limitation. Even that the delay circuit 5 as disclosed by this prior art patent application may be sufficient for the purpose of a ghost cancellation operation as of now, the usefulness of this variable delay circuit 5 may not be adequate for other types of application or even for newer techniques of ghost cancellation if greater ranges of delays or more dynamic variations of delays are required. Thirdly, in each clock cycle, the delay circuit 5 as shown can only read in a single input data and output a single delayed-input data through the I/O buffer 14. For modern high bandwidth applications, the requirements may become more demanding and dynamic such that a plurality of input data and output data are to be processed in each clock cycle. The delay circuit 5 would not be able to satisfy such requirements due to the reason that the I/O buffer 14 is operating at the speed of the system clock 12. Furthermore, in order to enable the processing of an additional delay request, another set of delay control circuits such as the delay means 16, 44, or 50 are to be added which would cause the delay circuit to become too complicate and voluminous for practical implementation.

Therefore, there is still a need in the art of variable length delay circuit to provide a circuit configuration and method such that the design and manufacture of such circuits can be simplified. Meanwhile, the circuit configuration and design method is required also to provide great degree of control flexibility and delay accuracy so that it can be suitable for various types of modern applications.

SUMMARY OF THE PRESENT INVENTION

It is therefore an object of the present invention to provide a circuit configuration and design method for variable length delay apparatus which can overcome the aforementioned difficulties encountered in the prior art.

Specifically, it is an object of the present invention to provide a variable length delay circuit and design method wherein a multiple-writing and multiple-reading delay circuit technique is utilized on a single RAM to simplify the control circuit.

Another object of the present invention is to provide a variable length delay circuit and design method wherein a multiple-writing and multiple-reading delay circuit technique is utilized on a single RAM to allow the flexibility of providing greater range of variable delays and in the meantime increase the accuracy of delay-time control.

Another object of the present invention is to provide a variable length delay circuit and design method wherein a multiple-writing and multiple-reading delay circuit technique is utilized on a single RAM to increase the throughput and improve the speed of the entire system utilizing this delay circuit.

Another object of the present invention is to provide a variable length delay circuit and design method wherein a single RAM may be employed to support multiple-writing and multiple-reading delay technique which is utilized to take advantage of the transmission of large volume of data generally occurs in modern video, audio, or multi-media type of communication applications.

Briefly, in a preferred embodiment, the present invention comprises a variable length delay circuit for generating a plurality of output data each representing a corresponding input data delayed by a variable length. The delay circuit comprises a single integrated data storage means for storing the input data therein. The delay circuit further includes a delay address generating means including a timing control block for controlling the operation of the variable delay circuit, a write control means for controlling the writing of the input data to a write-address in the data storage means, and a delay address means for receiving a plurality of variable length delays to generate for each of the delays a corresponding delay output address wherein each of the addresses covering the entire range of the storing means. The delay circuit further includes an output means for reading a plurality of output data from the data storage means at each of the delay output addresses for outputting the output data wherein each of the output data representing the corresponding input data delayed by the corresponding variable-length delay.

It is an advantage of the present invention that it provides a variable length delay circuit and design method wherein a multiple-writing and multiple-reading delay circuit technique is utilized on a single RAM to simplify the control circuit.

Another advantage of the present invention is that it provides a variable length delay circuit and design method wherein a multiple-writing and multiple-reading delay circuit technique is utilized on a single RAM to allow the flexibility of providing greater range of variable delays and in the meantime increase the accuracy of delay-time control.

Another advantage of the present invention is that it provides a variable length delay circuit and design method wherein a multiple-writing and multiple-reading delay circuit technique is utilized on a single RAM to increase the throughput and improve the speed of the entire system utilizing this delay circuit.

Another advantage of the present invention is that it provides a variable length delay circuit and design method wherein a multiple-writing and multiple-reading delay circuit technique is utilized on a single RAM to take advantage of the transmission of large volume of data which generally takes place in modern video, audio, or multimedia type of communication applications.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
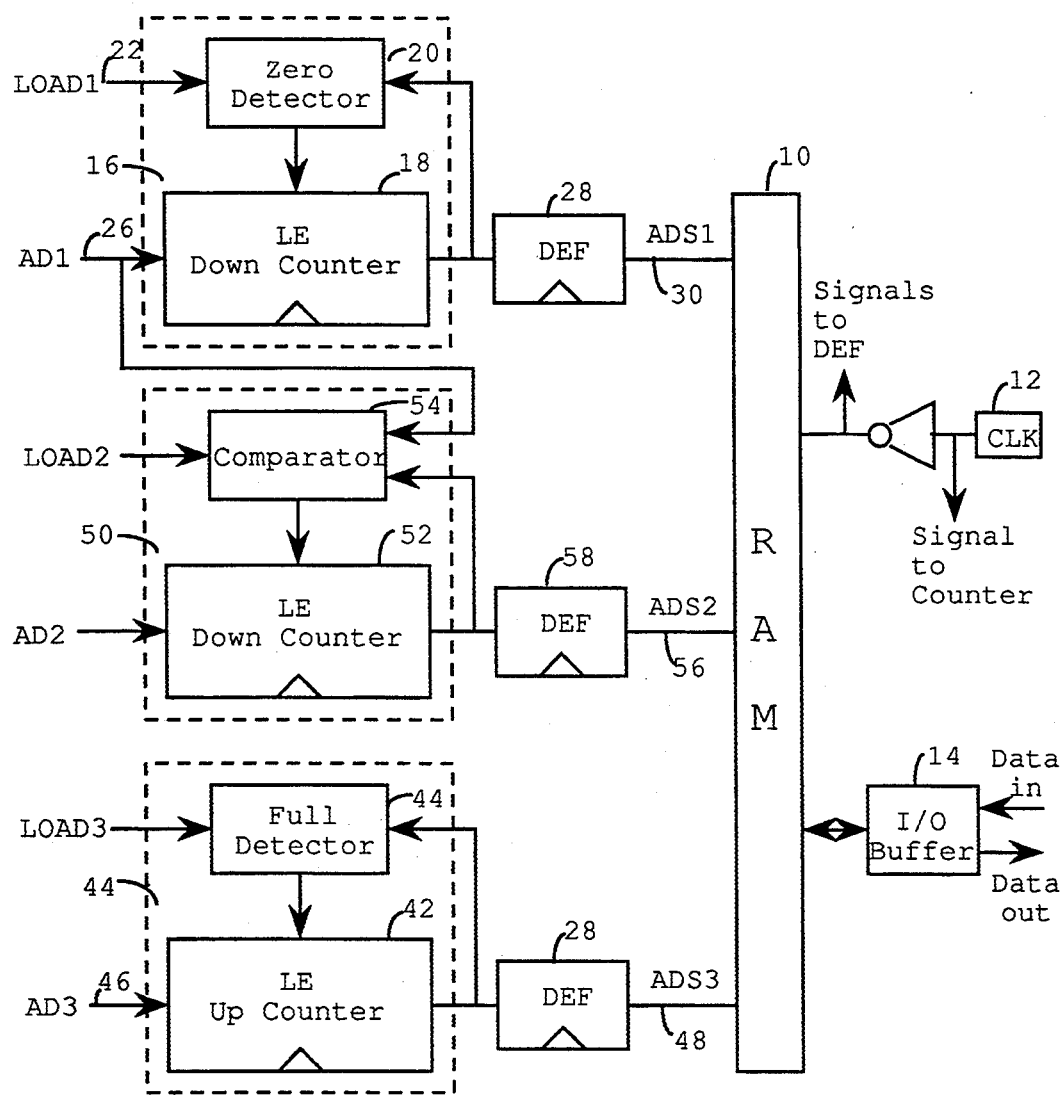
FIG. 1A is a functional block diagram of a variable delay circuit in accordance with a prior art patent application.
Figure 1B:
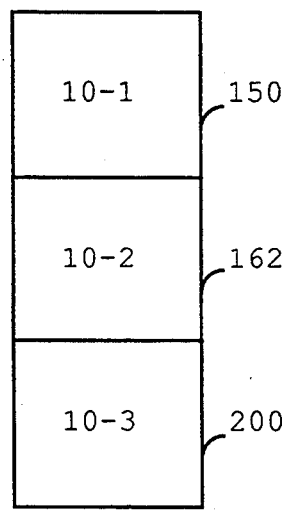
FIG. 1B is the structural configuration of a random access memory (RAM) used by the variable delay circuit of FIG. 1A.
Figure 2A:
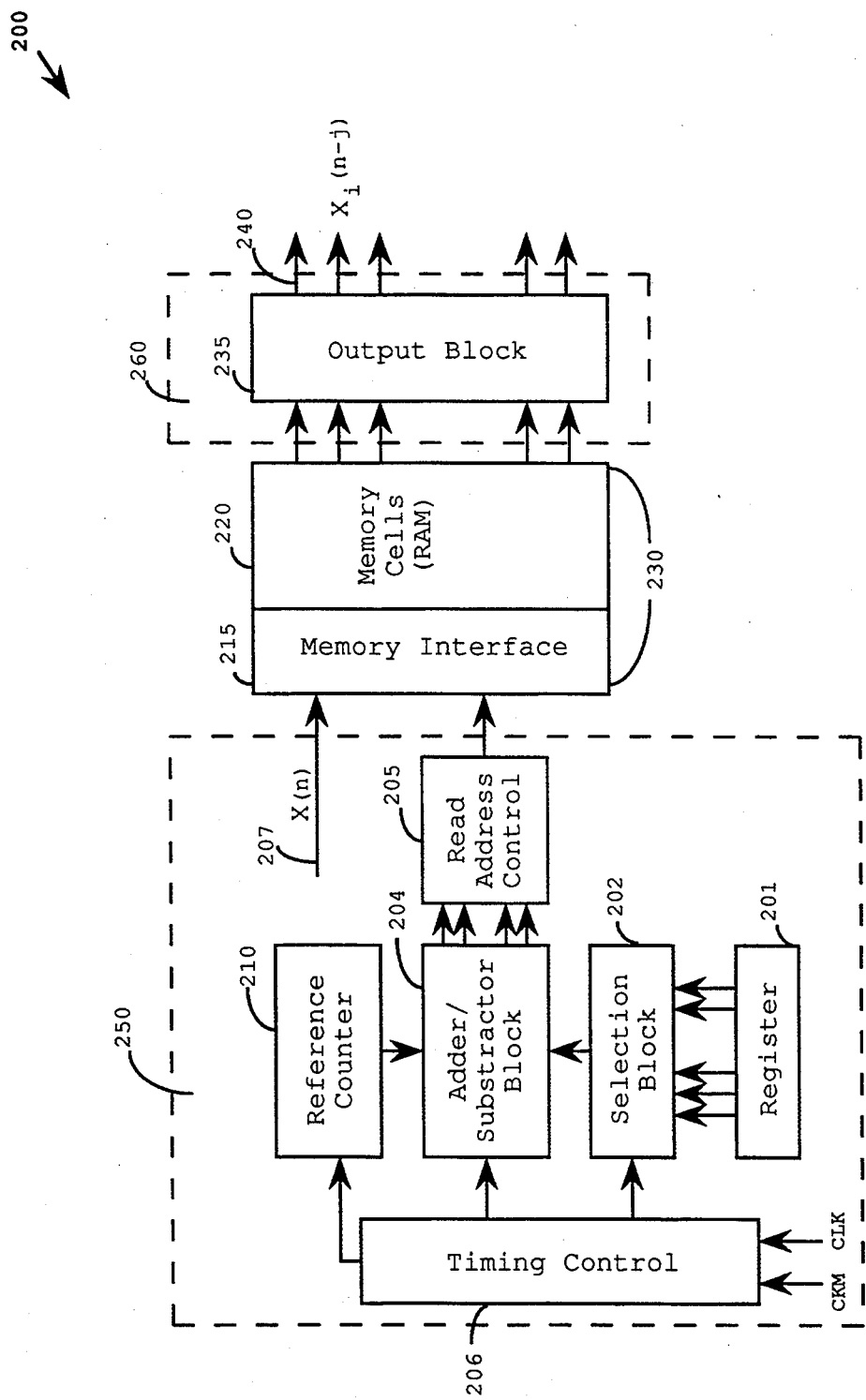
FIG. 2A is a functional block diagram of a single input and multiple output variable delay circuit in accordance with the present invention.
Figure 2B:
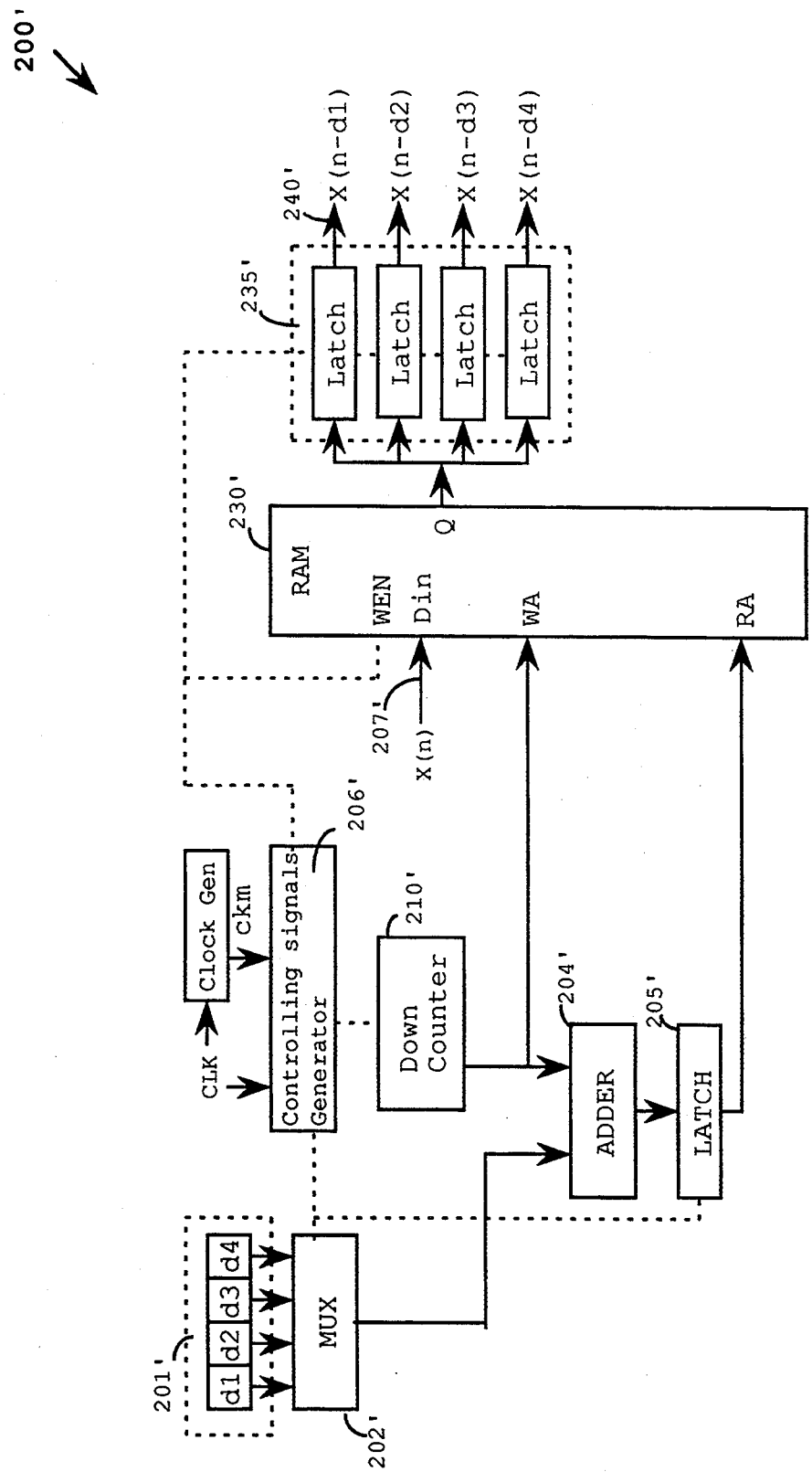
FIG. 2B is the block circuit diagram for implementing the delay circuit of FIG. 2A.

FIG. 2A shows a block functional diagram of a variable delay circuit 200 of the present invention which can accept a single input and generate multiple output data-items each has a variable length of delay. Referring also to FIG. 2B which shows a corresponding circuit structure for implementing the functional block design as shown in FIG. 2A. The variable delay circuit 200 has an input port 207 (port 207' in FIG. 2B) to receive a single input. The input X(n) is controlled by a timing control block 206 to be written into a random access memory (RAM) 220 via the processes performed by a memory interface 215. Referring to FIG. 2B, the counter unit 210' is implemented as a reference counter 210' to send a write enable (WEN) signal for writing the data X(n) via the input port 207' to the RAM 230'. In order to generate a delay output through an output port Q on the RAM 230' from the output control block 235 to the output lines 240, (i.e., the latch block 235' to the output lines 240' in FIG. 2B), a series of the number of delay cycles, i.e., d1,d2,d3, and d4, are stored in the registers 201. These number of delay cycles are then inputted to a selection block 202 which is implemented as a multiplexer 202'. A number of delay cycle is selected by the selection block 202 and inputted to an adder/subtracter block 204 which is implemented as an adder 204' in FIG. 2B. This selected number of delay cycles is then added to the current pointer index, i.e., n, generated by the reference counter 210 to generate a read address. The read address is inputted to a read address control block 205, i.e., a latch circuit 205', which generates a read address signal RA to activate the output port Q to output a delay data item located at address RA which is delayed by the number of clock cycles according to the selection made by the selection block 202.

In order to increase the throughput of the delay circuit 200, the timing control block 206 generates two clock signals. Referring to FIG. 2B where a normal clock signal CLK and another clock signal ckm which has frequency four times the frequency of CLK is generated. The read and write operations described above are performed at a speed according to the clock signals generated by the timing control block 206. Therefore, in each normal system clock cycle CLK, there are four delay output items being generated which are X(n-d1), X(n-d2), X(n-d3), and X(n-d4) wherein X(n) represent the current input item. These four delayed output items are temporarily stored in a latch block 235', i.e., the output block 235, to be outputted at a rate of normal system clock CLK. By the use of this single input and output RAM with a multiplexer for selection of multiple delays and an output block with multiple-output-latch, this variable delay circuit 200 which has single input port is able to simultaneously generate a multiple delayed output-items in each system clock cycle.

For the purpose of generating a variable delay output, the delay circuit 200 basically comprises three major functional blocks. The first functional block is a delay address generating means 250 which includes the register 201, the selection block 202, the adder/subtracter block 204, the read address control block 205, the timing control block 206, and the reference counter 210. The second major functional block is a data storage means 230 which comprises the memory interface unit 215 and the memory cells (RAM) 220. The third major functional block is the output means 260 which comprises an output block 235 including a plurality of output data lines 240 for outputting multiple data items which are delayed by a variable length of clock cycles from the input. The delay circuit 200 as shown in FIGS. 2A and 2B can therefore simultaneously process four delay values, i.e., d1 to d4, with a single delay address generating means 250. The entire range of the RAM 220 can be applied as the duration of each delay. Thus instead of the limitation:

$$d1+d2+d3+d4 \leq RAM_{MAX} \quad (1)$$

where $RAM_{MAX}$ is the maximum storage locations of the memory cell RAM 220, the range of each delay is now expanded such that:

$$MAX\{d1, d2, d3, d4\} \leq RAM_{MAX} \quad (2)$$

and where MAX {d1, d2, d3, d4} represents the maximum value of each of the delay values, i.e., d1, d2, d3, and d4. Because of the use of two clock rates, i.e., the system clock CLK and a faster clock rate ckm, plus the use of the latch block 235', four delayed output items can be generated in a single normal clock cycle CLK.

Figure 3A:
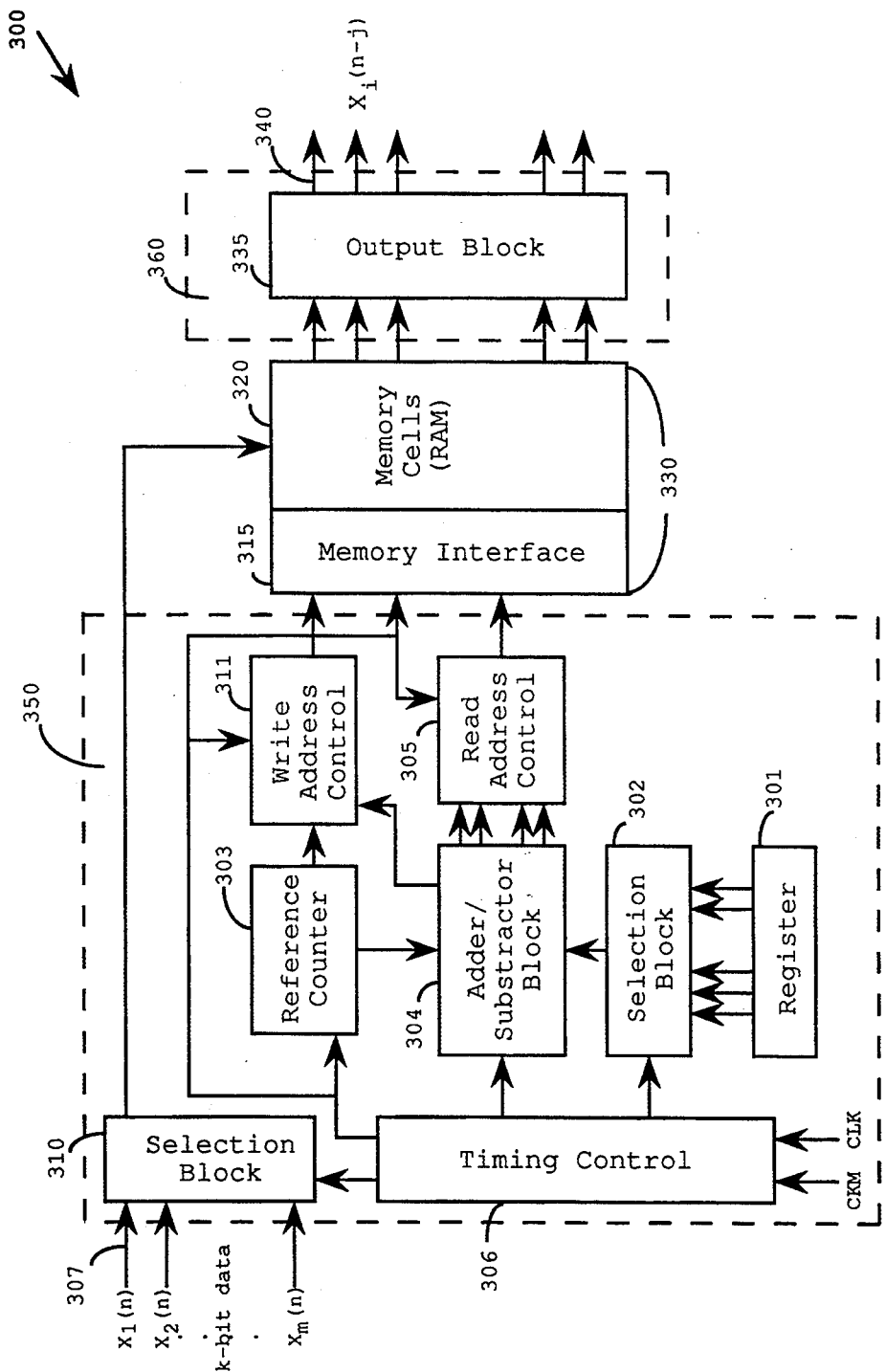
FIG. 3A is a functional block diagram of a multiple input and multiple output variable delay circuit in accordance with the present invention.
Figure 3B:
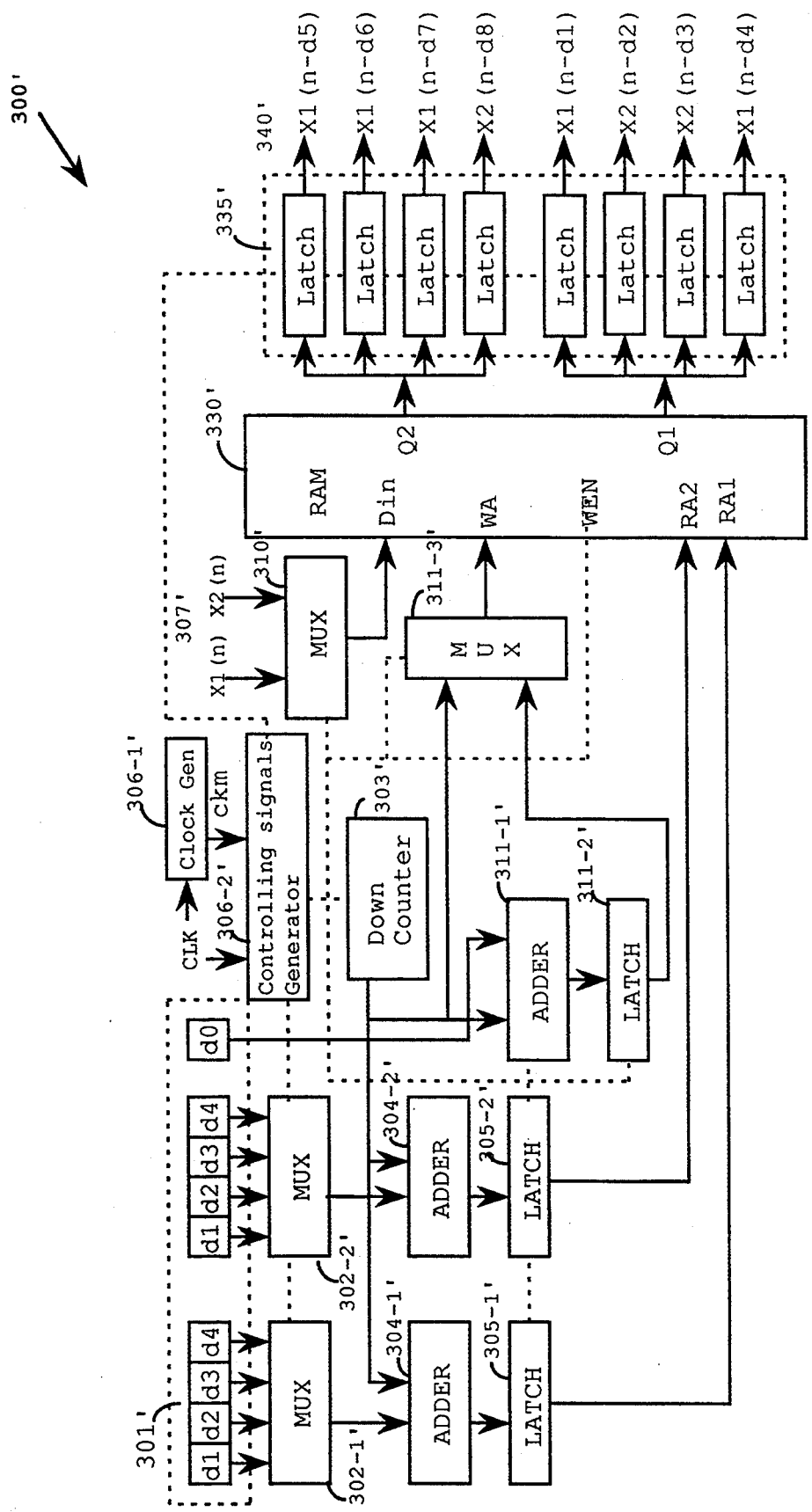
FIG. 3B is the block circuit diagram for implementing the delay circuit of FIG. 3A.

FIG. 3A shows a block functional diagram of another variable delay circuit 300 of the present invention which can accept a multiple input, i.e., X1(n), X2(n),. . ., Xm(n), and generate multiple output data-items each has a variable length of delay. Referring also to FIG. 3B which shows a corresponding circuit structure 300' for implementing the functional block design with m=2, i.e., receiving two input data items in each clock cycle, as shown in FIG. 3A. The variable delay circuit 300 has an input port 307 (port 307' in FIG. 3B) to receive a plurality of input, i.e., two input data X1(n) and X2(n) from the input port 307' in FIG. 3B. The input $X_i(n)$ where i=1 to m, are controlled by a selection block 310 which selects the individual input data to be buffered into the RAM cells. A reference counter 303 then generates a reference address which is then transmitted to a write address control 311 for controlling the write-address for writing the input data to the RAM cell 320 via the processes performed by a memory interface 315 which include the address decoding and the read/write control. Referring to FIG. 3B, the selection block 310 is implemented as a multiplexing means 310' and reference counter 303 is implemented as a down counter 303' while the write address control 311 is implemented in FIG. 3B to include an adder 311-1', a latch 311-2' and a multiplexing means 311-3' to send an write enable (WEN) and a write address (WA) signals for writing the data X(n) received from the input port 307' to the RAM 330'. In order to receive multiple input data in a single clock cycle, two kinds of clock cycles are used which is generated by the timing control block 306, i.e., a normal clock cycle CLK and a second clock ckm with higher frequency, i.e., four times the frequency of CLK as used in the circuit 300'. By the use of this write address control 310 which is operating with these two types of clock cycles, the delay circuit 300 is able to receive multiple input data in each system clock cycle CLK.

In order to generate a delay output through an output port Q on the RAM 330' from the output control block 335 to the output lines 340, (i.e., the latch block 335' to the output lines 340' in FIG. 3B), two sets of delay cycle values, i.e., d1,d2,d3, and d4, and d5, d6, d7, and d8, are stored in the registers 301. These number of delay cycles are then inputted to a selection block 302 which is implemented as two multiplexers 302-1' and 302-2'. Two numbers of delay cycle are selected by the selection block 302 and inputted to an adder/subtracter block 304 which is implemented as two adders 304-1' and 304-2' in FIG. 3B. These selected numbers of delay cycles are then added to the current pointer index, i.e., n, generated by the timing control circuit 303 to generate a pair of read addresses. The read addresses are inputted to a read address control block 305, i.e., a pair of latch circuits 305-1' and 305-2', which generates a pair of corresponding read addresses signal RA1 and RA2 to activate the output ports Q1 and Q2 to output a pair of delay data items located at addresses RA1 and RA2 which are delayed by the number of clock cycles according to the selection made by the selection block 302 among d1 to d4 and d5 to d8.

The throughput of the delay circuit 300 are increased by the use of the timing control block 306 generates two clock signals and by multiplexing the reading of multiple input data and the output of multiple delayed input. Referring to FIG. 3B where a normal clock signal CLK and another clock signal ckm which has frequency four times the frequency of CLK is generated. The read and write operations described above are performed at a speed according to the clock signals generated by the timing control block 306. Therefore, in each normal system clock cycle CLK, there are two pairs of four delay output items being generated which are $X(n-d1)$, $X(n-d2)$, $X(n-d3)$, and $X(n-d4)$ and $X(n-d5)$, $X(n-d6)$, $X(n-d7)$, and $X(n-d8)$ wherein $X(n)$ represent the current input item. These two pairs of four delayed output items are temporarily stored in a latch block 335', i.e., the output block 335, to be outputted at a rate of normal system clock CLK. By the use of this RAM 330' with dual input ports 307' and dual output ports 340' coupling with multiplexing means, this variable delay circuit 300 is able to receive multiple input and generate a multiple delayed output data items, each with a selected delay time, in a system clock cycle CLK.

For the purpose of generating a variable delay output, the delay circuit 300 basically comprises three major functional blocks. The first functional block is a delay address generating means 350 which includes the register 301, the selection block 302, the reference counter 303, the adder/subtracter block 304, the read address control block 305, the timing control block 306, and the selection block 310. The second major functional block is a data storage means 330 which comprises the memory interface unit 315 and the memory cells (RAM) 320. The third major functional block is the output means 360 which comprises an output block 335 including a plurality of output data lines 340 for outputting multiple data items which are delayed by a variable length of clock cycles from the input.

Figure 4A:
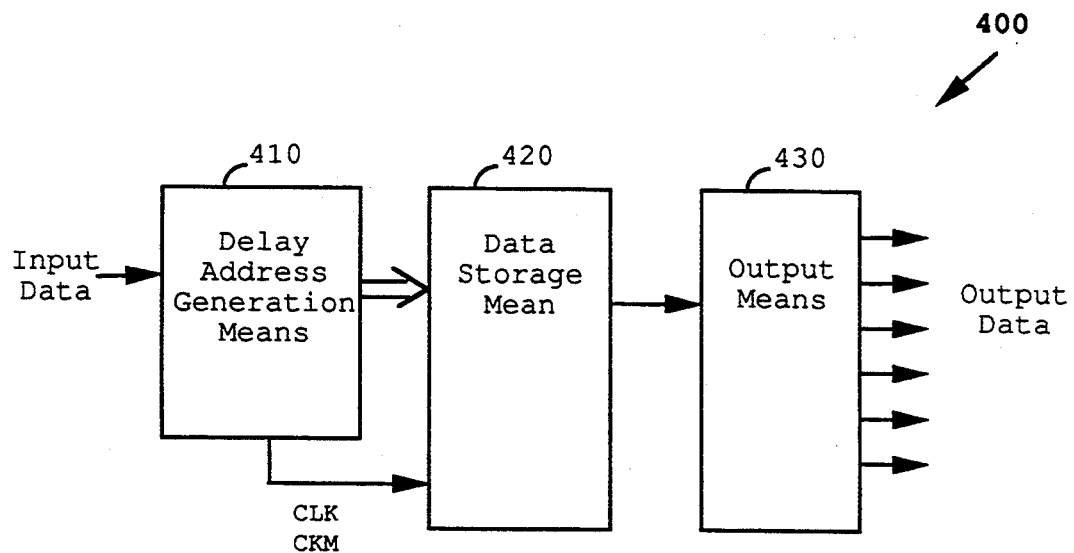
FIG. 4A is a block diagram showing the system configuration of a variable delay circuit of either FIG. 2 or FIG. 3.

FIG. 4A is a functional block diagram which shows a variable delay circuit 400 according to the present invention as shown in either FIGS. 2A, and 2B or FIG. 3A and 3B. The variable delay circuit 400 includes a delay address generating means 410 for reading in a plurality of input data and a corresponding delays under the control of multiple clock signals each has a different frequency. The delay address generating means further control the addresses for writing and reading of these data items at different locations of a memory storage means 420, i.e., a RAM. The delay circuit further has an output means 430 for reading of multiple delayed input data items according to the addresses and control signals generated by the delay address generating means 410.

Figure 4B:
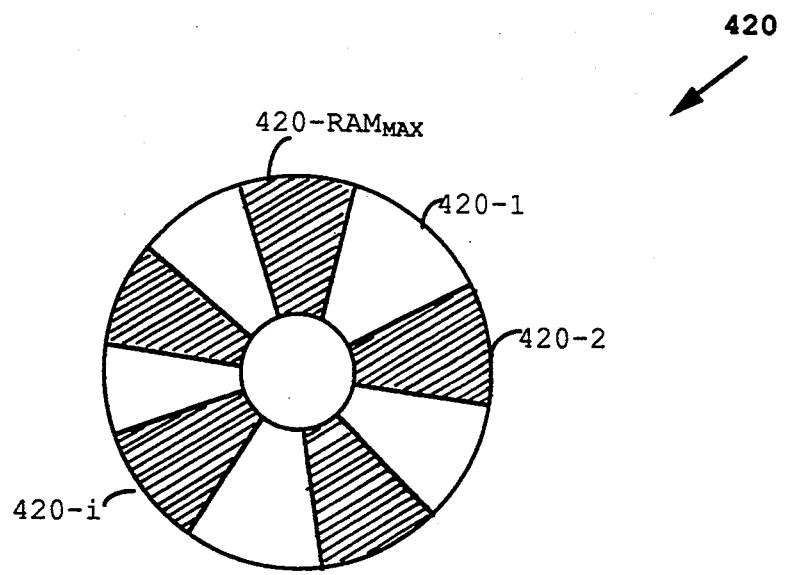
FIG. 4B is a configuration diagram showing the input and output operations on a random access memory (RAM) employed in a variable delay circuit of FIG. 4A.

FIG. 4B shows the structure of the RAM 420 as that is being utilized by the present invention for the purpose of generating multiple output each representing a delayed input. For the purpose of description, the RAM 420 includes memory cells, i.e., cells 420-i where $i=1,2,3,\ldots$, $RAM_{MAX}$ wherein $RAM_{MAX}$ is shown as 512, each cell 420-i is for storing an input data which is written under the control of the delay address generating means 410 at a specific location. In each clock cycle, multiple new data items are written to new current memory cells 420-i according to the delay address generating means 410. The memory cell 420 is further connected to the output means whereby each memory cell 420-i may generate an output data item representing a delayed input under the control of the delay address generating means 410 which provides the read address signals to activate the output of a data item from a plurality of memory cells 420-i in each clock cycle CLK wherein n may vary between 1 to $RAM_{MAX}$.

The present invention thus discloses a variable length delay circuit 400 for generating a plurality of output data each representing a corresponding input data delayed by a variable length. The delay circuit 400 comprises a single integrated data storage means, i.e., the RAM 420 for storing the input data therein. The delay circuit further includes a delay address generating means 410 which includes a timing control block, i.e., the timing control block 306 in FIG. 3A, for controlling the operation of the variable delay circuit. The delay address generating means 410 further includes a write control means, i.e., the selection block 310, the reference counter 303, and the write address control 311 in FIG. 3A, for controlling the writing of the input data to a write address in the data storage means. The delay address generating means further includes a delay address means, i.e., the registers 301, the selection block 302, the adder subtracter 304, and the read address control 305 in FIG. 3A, for receiving a plurality of variable length delays to generate for each of the delays a corresponding delay output address wherein each of the addresses covering the entire range of the storing means 420. The delay circuit 400 further includes an output means 430 for reading a plurality of output data from the data storage means, i.e., the RAM 420, at each of the delay output addresses for outputting the output data each representing the corresponding input data delayed by the variable-length delay.

In a preferred embodiment, the present invention discloses a variable length delay circuit 300 for generating a plurality of output data each representing a corresponding input data delayed by a variable length. The delay circuit 300 comprises a single integrated data storage means 320 for storing the input data therein. The delay circuit 300 also includes a delay address generating means 350 including a timing control block 306 for controlling the operation of the variable delay circuit 300. The delay address generating mean 350 also includes a write control means including the selection block 310, the reference counter 303, and the write address control 311 for controlling the writing of the input data to a write-address (WA) in the data storage means 320. The delay address generating means also includes a delay address means including the registers 301, the selection block 302, the adder/subtracter block 304, and the read address control 305 for receiving a plurality of variable length delays to generate for each of the delays a corresponding delay output address, i.e., RA1 and RA2 wherein each of the delay output addresses covering the entire range of the storing means 320. The timing control block 306 generates a normal system clock signal CLK and a higher-frequency clock signal ckm at a multiple frequency rate of the normal system clock signal. The write control means further including a multiplexing means, i.e., the selection block 310, controlled by the higher-frequency clock signal ckm for enabling simultaneous input of a plurality of the input data to be delayed by the delay circuit 300. The delay address means further including a delay address computing means including an adding or subtracting means such as the adders 304' and latches 305' controlled by the higher-frequency clock signal ckm thus enabling simultaneous computing the delay output addresses in the storage means 320 by using the variable-length delays, i.e., d1 to d4, and d5 to d8. The delay address means further including a multiplexing means, i.e., selection block 302, controlled by the higher-frequency clock ckm signal thus enabling simultaneous input of a plurality of multiple sets of the variable-length delays for generating the delay output addresses in the storage means 320. The delay address means further includes a plurality of registers 301 for simultaneous receiving and temporary storing the plurality of multiple sets of variable-length delays, i.e., d1 to d4, and d5 to d8, for computing the delay output addresses in the storage means 320. The delay circuit 300 further includes an output means 360 for reading a plurality of output data from the data storage means 320 at each of the delay output addresses, i.e., RA1 and RA2, for outputting the output data wherein each output data representing the corresponding input data delayed by the corresponding variable-length delay, i.e., d1 to d4, and d5 to d8. The output means 360 further includes a latching block 340' controlled by the higher-frequency clock signal ckm thus enabling simultaneous output of the plurality of output data according to the normal system clock signal CLK.

The present invention also discloses a method for generating a plurality of output data each representing a corresponding input data delayed by a variable length. The method comprises the steps of (a) controlling the operation of a variable delay circuit 300 by the use of a timing control block 306; (b) storing the input data in a single integrated data storage means 320 by employing a write control means including the selection block 310, the reference counter 303, and the write address control 311 for writing the input data to a write-address WA; (c) receiving a plurality of variable length delays, i.e., d1 to d4, and d5 to d8, to generate for each of the delays a corresponding delay output address by employing a delay address generating means including the registers 301, the selection block 302, the adder/subtracter 304, and the read address control 305, wherein each of the addresses covering the entire range of the storing means 320; and (d) reading a plurality of output data from the data storage means 320 at each of the delay output addresses, i.e., RA1 and RA2, for outputting the output data wherein each of the output data representing the corresponding input data delayed by the corresponding variable-length delay, i.e., d1 to d4, and d5 to d8.

Therefore, a variable delay circuit is provided by the present invention which teaches a circuit configuration and design method for constructing a variable length delay apparatus which can overcome the limitations and difficulties encountered in the prior art. Specifically, the present invention provides a variable length delay circuit and design method wherein a multiple-writing and multiple-reading delay of input and output data in a single clock cycle are achieved which is realized on a single RAM with simplified control circuit.

Furthermore, the present invention allows the multiple-writing and multiple-reading operations to be performed on a single RAM which allows greater range of variable delays by fully utilizing the entire storage capacity of the memory cells. The present invention also provides a variable length delay circuit and design method wherein the system throughput is increased because the multiple-writing and multiple-reading operations can now be performed in a single system clock. Therefore, the present invention is able to take advantage of the transmission of large volume of data generally occurs in modern video, audio, or multi-media type of communication applications and provides a variable delay circuit to satisfy the requirements of higher performance level with broader range and more dynamic variations of delays.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A variable length delay circuit for generating a plurality of output data each representing a corresponding input data delayed by a variable length, said delay circuit comprising:

a single integrated data storage means for storing said input data therein;

a delay address generating means including a timing control block for controlling the operation of said variable delay circuit wherein said timing control block utilizing a normal system clock signal and a higher-frequency clock signal at a multiple frequency rate of said normal system clock signal;

said delay address generating means further including an address a write control means for controlling the writing of said input data to a write-address in said data storage means, said delay address generating means further including a delay address means for receiving a plurality of variable length delays to generate for each of said delays a corresponding delay output address wherein each of said addresses covering the entire range of said storing means;

an output means for reading a plurality of output data from said data storage means at each of said delay output addresses for outputting said output data wherein each of said output data representing said corresponding input data delayed by said corresponding variable-length delay; and said output means further includes a latching block controlled by said higher-frequency clock signal thus enabling simultaneous output of said plurality of output data according to said normal system clock signal.

2. The variable length delay circuit of claim 1 wherein:

said write control means further includes an input multiplexing means controlled by said higher-frequency clock signal thus enabling simultaneous input of a plurality of said input data to be delayed by said delay circuit.

3. The variable length delay circuit of claim 2 wherein:

said delay address means further includes a delay multiplexing means controlled by said higher-frequency clock signal thus enabling simultaneous input of a plurality of multiple sets of said variable-length delays for generating said delay output addresses in said storage means.

4. The variable length delay circuit of claim 3 wherein:

said delay address means further includes a delay address computing means including adding or subtracting means and latches controlled by said higher-frequency clock signal thus enabling simultaneous computing said delay output addresses in said storage means by using said variable-length delays.

5. The variable length delay circuit of claim 4 wherein:

said delay address means further includes a plurality of registers for simultaneous receiving and temporarily storing said plurality of multiple sets of variable-length delays to be used by said delay address computing means for computing said delay output addresses in said storage means.

6. A variable length delay circuit for generating a plurality of output data each representing a corresponding input data delayed by a variable length, said delay circuit comprising:

a single integrated data storage means for storing said input data therein;

a delay address generating means including a timing control block for controlling the operation of said variable delay circuit, a write control means for controlling the writing of said input data to a write-address in said data storage means, and a delay address means for receiving a plurality of variable length delays to generate for each of said delays a corresponding delay output address wherein each of said delay output addresses covering the entire range of said storing means;

said timing control block utilizing a normal system clock signal and a higher-frequency clock signal at a multiple frequency rate of said normal system clock signal;

said write control means further including a multiplexing means controlled by said higher-frequency clock signal for enabling simultaneous input of a plurality of said input data to be delayed by said delay circuit;

said delay address means further including a delay address computing means including adding or subtracting means and latches controlled by said higher-frequency clock signal thus enabling simultaneous computing said delay output addresses in said storage means by using said variable-length delays;

said delay address means further including a multiplexing means controlled by said higher-frequency clock signal thus enabling simultaneous input of a plurality of multiple sets of said variable-length delays for generating said delay output addresses in said storage means;

said delay address means further includes a plurality of registers for simultaneous receiving and temporary storing said plurality of multiple sets of variable-length delays for computing said delay output addresses in said storage means;

an output means for reading a plurality of output data from said data storage means at each of said delay output addresses for outputting said output data wherein each output data representing said corresponding input data delayed by said corresponding variable-length delay; and said output means further includes a latching block controlled by said higher-frequency clock signal thus enabling simultaneous output of said plurality of output data according to said normal system clock signal.

7. A method for generating a plurality of output data each representing a corresponding input data delayed by a variable length, said method comprising the steps of:

(a) controlling the operation of a variable delay circuit by the use of a timing control block;

(b) storing said input data in a single integrated data storage means by employing a write control means for writing said input data to a write-address;

(c) receiving a plurality of variable length delays to generate for each of said delays a corresponding delay output address by employing a delay address generating means wherein each of said addresses covering the entire range of said storing means; and (d) reading a plurality of output data from said data storage means at each of said delay output addresses for outputting said output data wherein each of said output data representing said corresponding input data delayed by said corresponding variable-length delay.

* * * * *